US008417757B2

(12) United States Patent
Cho et al.

(10) Patent No.: US 8,417,757 B2
(45) Date of Patent: Apr. 9, 2013

(54) METHOD AND APPARATUS FOR MODULO N CALCULATION WHEREIN CALCULATION RESULT IS APPLIED TO MATCH SPEEDS IN WIRELESS COMMUNICATION SYSTEM

(75) Inventors: Seong Chul Cho, Daejeon (KR); Hyung Jin Kim, Deajeon (KR); Gweon Do Jo, Daejeon (KR); Jin Up Kim, Daejeon (KR); Dae Sik Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/517,893

(22) PCT Filed: Jun. 19, 2007

(86) PCT No.: PCT/KR2007/002971
§ 371 (c)(1),
(2), (4) Date: Jun. 5, 2009

(87) PCT Pub. No.: WO2008/069383
PCT Pub. Date: Jun. 12, 2008

(65) Prior Publication Data
US 2011/0016168 A1 Jan. 20, 2011

(30) Foreign Application Priority Data

Dec. 7, 2006 (KR) .................. 10-2006-0124183
May 8, 2007 (KR) .................. 10-2007-0044653

(51) Int. Cl.
*G06F 7/38* (2006.01)
(52) U.S. Cl. .................. 708/491; 708/653; 708/655
(58) Field of Classification Search .................. 708/491, 708/653, 655
See application file for complete search history.

(56) References Cited

U.S. PATENT DOCUMENTS 5,249,148 A 9/1993 Catherwood et al.
5,289,397 A * 2/1994 Clark et al. .................. 708/491
(Continued)

FOREIGN PATENT DOCUMENTS

JP 2002-251137 9/2002
KR 1020010108780 12/2001
(Continued)

OTHER PUBLICATIONS

Technical Specification 3GPP TS 25.212 V3.5.0 (Dec. 2000), 3rd Generation Partnership Project; pp. 1-64; Note: Chapters 4.2.3.2.3.1, 4.2.3.2.3.2, 4.2.3.2.3.3; DATE:1999.*

(Continued)

*Primary Examiner* — Tammara Peyton
(74) *Attorney, Agent, or Firm* — Nelson Mullins Riley & Scarborough LLP; EuiHoon Lee, Esq.

(57) ABSTRACT

A modulo N calculating method for an M1*M2-bit binary integer, wherein N, M1 and M2 are integers, includes the steps of dividing the M1*M2-bit binary integer into M1 bits and performing AND operation on each M1 bits and a specific binary integer; and changing a value of an output register depending on the AND operation result and storing the value thereto. A modulo N calculating apparatus includes an input unit for receiving an M1*M2-bit binary integer, wherein N, M1 and M2 are integers; and an AND operation unit for performing AND operation on the M1*M2-bit binary integer and a specific binary integer. Furthermore, when the M1 and the N may be 4 and 3, respectively, the specific binary value may be 1010 or 0101.

7 Claims, 3 Drawing Sheets

U.S. PATENT DOCUMENTS

| | | |
|---|---|---|
| 5,724,279 A | 3/1998 | Benaloh et al. |
| 5,793,660 A | 8/1998 | Rentschler |
| 7,031,995 B2 | 4/2006 | Schmandt et al. |
| 7,415,494 B2* | 8/2008 | Aldridge et al. ............... 708/655 |
| 7,647,367 B2* | 1/2010 | Fischer et al. ................ 708/491 |
| 7,831,650 B2* | 11/2010 | Elbe et al. ..................... 708/491 |
| 2002/0116429 A1 | 8/2002 | Chen et al. |
| 2005/0004967 A1 | 1/2005 | Becker |
| 2008/0114820 A1* | 5/2008 | Amin et al. ................... 708/209 |

FOREIGN PATENT DOCUMENTS

| | | |
|---|---|---|
| KR | 1020040081581 | 9/2004 |
| KR | 1020050041567 | 5/2005 |

OTHER PUBLICATIONS

Korean Office Action for Application No. 10-2007-0044653, dated May 22, 2009.

* cited by examiner

METHOD AND APPARATUS FOR MODULO N CALCULATION WHEREIN CALCULATION RESULT IS APPLIED TO MATCH SPEEDS IN WIRELESS COMMUNICATION SYSTEM

RELATED APPLICATIONS

This application is a 35 U.S.C. §371 national stage filing of PCT Application No. PCT/KR2007/002971 filed on Jun. 19, 2007, which claims priority to, and the benefit of, Korean Patent Application No. 10-2006-0124183 filed on Dec. 7, 2006 and Korean Patent Application No. 10-2007-0044653 filed on May 8, 2007. The contents of the aforementioned applications are hereby incorporated by reference.

TECHNICAL FIELD

The present invention relates to a modulo calculating method in a modulo calculating apparatus, and more particularly, to a method and an apparatus capable of performing modulo N calculation on an M1*M2-bit binary integer K, e.g., a 4*M2-bit binary integer K by using a simplified logic circuit (M1 and M2 are integers that are 0 or greater).

BACKGROUND ART

Modulo 3 calculation is necessarily used to match speeds of turbo codes, including puncturing of the 3rd generation partnership project (3GPP).

A conventional modulo 3 calculation device includes a first counter for counting up to an input integer K and a second counter for counting 0, 1 and 2 circularly.

FIG. 1 is a flowchart illustrating a conventional method for modulo 3 calculation.

In the conventional modulo 3 calculating method as shown in FIG. 1, until the first counter counts up to the input integer K, the second counter circularly counts 0, 1, 2, 0, 1, 2 . . . . Then, the first counter completes counting up to the input integer K, the current value of the second counter is detected and outputted as a result value.

In such a modulo calculating apparatus, the numbers of counting times by the two counters correspond to the input integer, so that the greater the input integer is, the more time is spent.

DISCLOSURE OF INVENTION

Technical Problem

It is, therefore, an object of the present invention to provide a method of rapidly performing modulo N calculation using a simplified logic circuit.

Technical Solution

In accordance with an aspect of the invention, there is provided a modulo N calculating method for an M1*M2-bit binary integer, wherein N, M1 and M2 are integers, the method including the steps of: dividing the M1*M2-bit binary integer into M1 bits and performing AND operation on each M1 bits and a specific binary integer; and changing a value of an output register depending on the AND operation result and storing the value thereto.

When the M1 is 4 and the N is 3, the specific binary integer may be binary value 0101.

Further, when the M1 is 4 and the N is 3, the specific binary integer may be binary value 1010.

It is preferable that after the AND operation, a specific value depending on the AND operation result is added to the value of the output register.

Further, the specific value may be added by the steps of (a) performing the AND operation on the M1 least significant bits of the M1*M2-bit binary integer and a binary value 0101; (b) adding one value of 0, 1 and 2 to the value of the output register depending on the AND operation result of the step (a); (c) performing the AND operation on the M1 least significant bits of the M1*M2-bit binary integer and a binary value 1010; (d) adding one value of 0, 2 and 4 to the value of the output register depending on the AND operation result of the step (c); (e) shifting the M1*M2-bit binary integer by M1 bits to the right; and (f) performing the steps (a) to (e) M2 times.

It is preferable that the specific value is added by the further steps of (g) after performing the step (f), determining whether the value of the output register is 3 or smaller; and (h) performing the steps (a) to (d) repeatedly, until it is determined in the step (g) that the value of the output register is 3 or smaller.

In accordance with another aspect of the invention, there is provided a modulo N calculating apparatus including an input unit for receiving an M1*M2-bit binary integer, wherein N, M1 and M2 are integers; and an AND operation unit for performing AND operation on the M1*M2-bit binary integer and a specific binary integer.

When the M1 is 4 and the N is 3, the specific binary integer may be binary value 0101.

Further, when the M1 is 4 and the N is 3, the specific binary integer may be binary value 1010.

It is preferable that after the M1*M2-bit binary integer is divided into M1 bits, the AND operation unit performs AND operation on each M1 bits and the specific binary integer and a specific value depending on the AND operation result is added.

Advantageous Effects

As described above, in the method for modulo 3 calculation in accordance with the present invention, the modulo 3 calculation can be efficiently performed on any input integer K by addition of a logic circuit for the two AND operations, so that the modulo result can be obtained more rapidly.

BRIEF DESCRIPTION OF THE DRAWINGS

The above and other objects and features of the present invention will become apparent from the following description of embodiments given in conjunction with the accompanying drawings, in which.

BEST MODE FOR CARRYING OUT THE INVENTION

Hereinafter, a preferred embodiment of the present invention will be described in detail with reference to the accompanying drawings.

Figure 1:
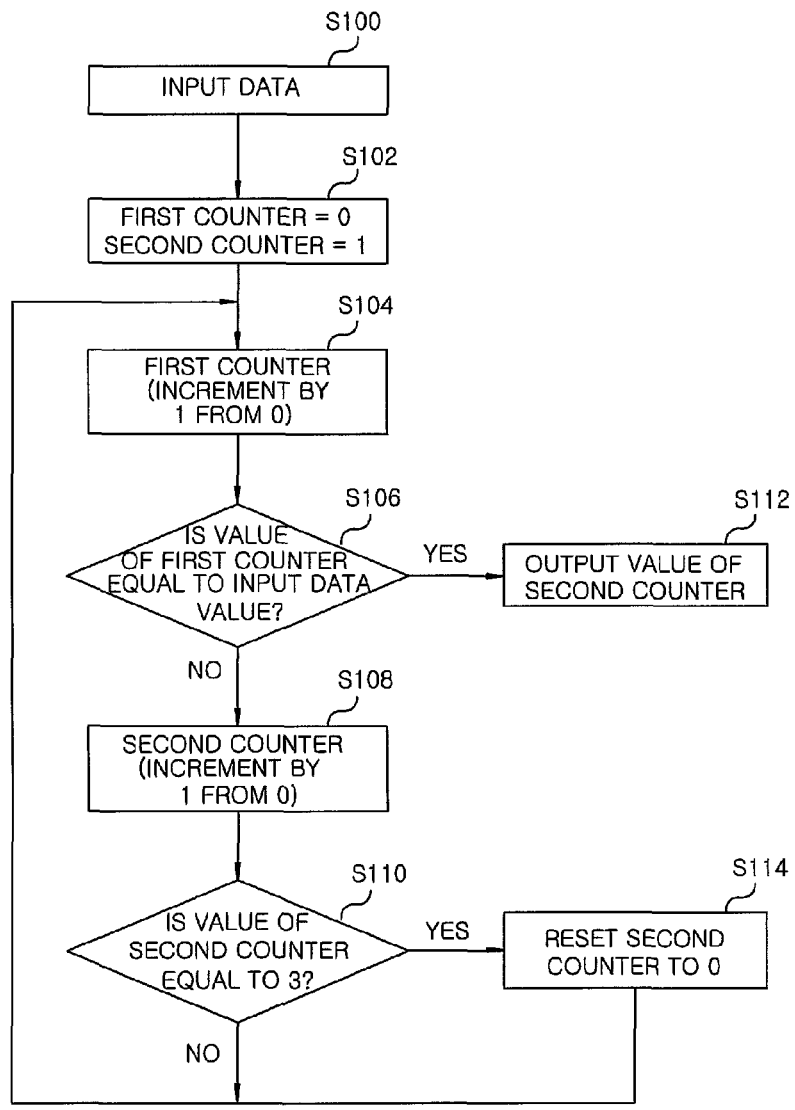
FIG. 1 is a flowchart illustrating a conventional modulo 3 calculating method.
Figure 2:
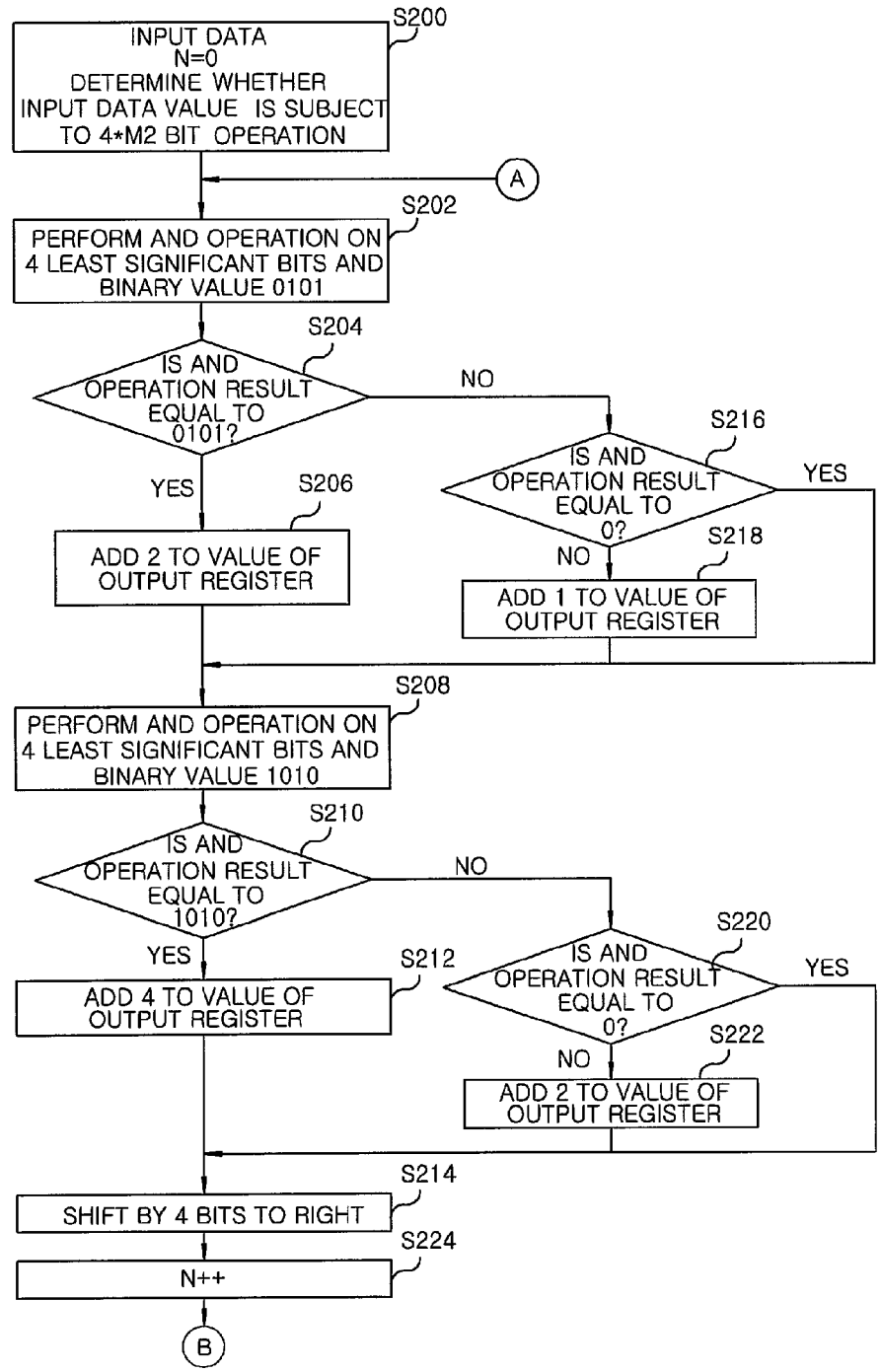
FIGS. 2 and 3 are flowcharts illustrating a modulo N calculating method in a modulo N calculating apparatus of preferred embodiment in accordance with the present invention.
Figure 3:
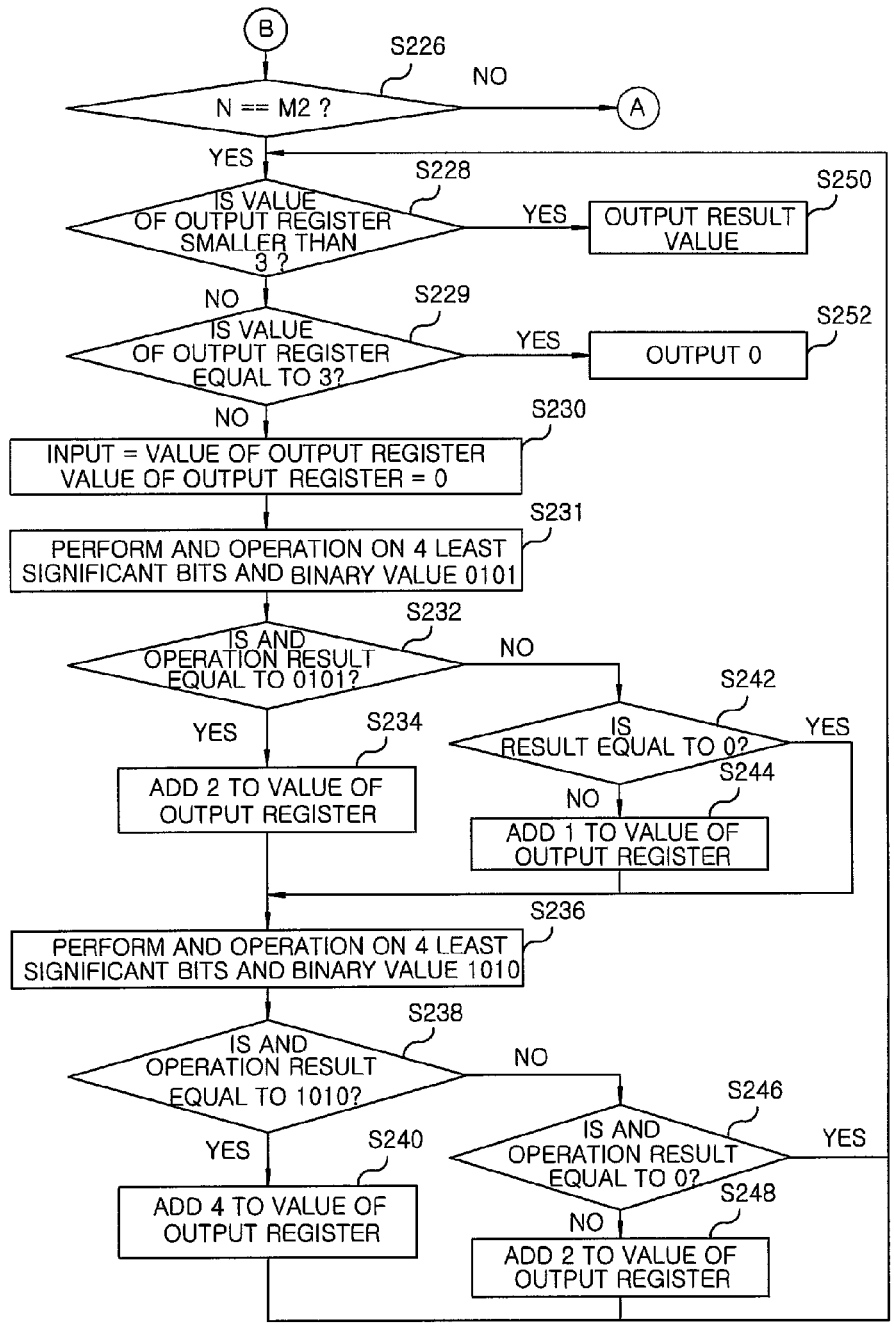

FIGS. 2 and 3 are flowcharts illustrating a modulo N calculating method in a modulo N calculating apparatus of a preferred embodiment in accordance with the present invention.

First, a determination is made as to whether an input integer K is subject to M1*M2-bit operation (S200), and an AND operation is performed on the M1 least significant bits of the input integer and a specific binary value. For example, when M1=4 and N=3, an AND operation is performed on the 4 least significant bits of the input integer and a binary value 0101 (S202), as illustrated in FIG. 2.

A determination is made as to what the AND operation result is and a value of an output register is changed depending on the AND operation result. The value of the output register may be initialized to 0.

For example, when it is determined in step S204 that the AND operation result is binary value 0101, 2 is added to the value of the output register (S206). When the result is 0, 0 is added to the value of the output register (S216). When the AND operation result is neither binary value 0101 nor 0, 1 is added to the value of the output register (S218).

The AND operation is then performed on the 4 least significant bits of the input integer and another binary value 1010 (S208). A determination is made as to what the AND operation result is and the value of the output register is changed depending on the AND operation result.

For example, when it is determined in step S210 that the AND operation result is binary value 1010, 4 is added to the value of the output register (S212). When the AND operation result is 0, 0 is added to the value of the output register (S220). When the AND operation result is neither binary value 1010 nor 0, 2 is added to the value of the output register (S222).

The input integer K is shifted by 4 bits to the right (S214). After the 4 least significant bits are discarded by this manner, the new 4 least significant bits are subject to the above steps from S202 to S222. This process corresponds to step S224 of FIG. 2. In the case of 4*M2-bit operation, the shift-right operation is performed M2 times (S226).

After the shift-right operation is performed M2 times, the value of the output register is compared with 3 (S228). When the value of the output register is smaller than 3, it is directly outputted as the result value (S250). When the value of the output register is equal to 3 (S229), 0 is outputted as the result value (S252).

Steps S228 to S248 are repeatedly performed until the value of the output register is equal to 3 or less. When the value of the output register is greater than 3, the value of the output register is stored as an input for the AND operation and the value of the output register is initialized to 0. One value of 0, 1 and 2 is added to the value of the output register depending on the result of the AND operation with binary value 0101 and one value of 0, 2 and 4 is added to the value of the output register depending on the result of the AND operation with binary value 1010. Consequently, in the case that the value of the output register is smaller than or equal to 3, the value of the output register or 0 is outputted as the result value, respectively, in the same manner described above. In the case that the value of the output register is greater than 3, the input for the AND operation is reset and the value of the output register is initialized to 0 in the same manner described above, and the same process is repeatedly performed.

As one example, the modulo 3 calculation for an input value 37, i.e., 0000 0000 0010 0101 in 16-bit operation using the method in accordance with the present invention will now be described.

First, the AND operation is performed on the 4 least significant bits 0101 and a binary value 0101. Since the AND operation result is 0101, 2 is added to the value of the output register.

The AND operation is then performed on the 4 least significant bits 0101 and binary value 1010. Since the result is 0, 0 is added to the value of the output register.

Thus, the current value of the output register becomes 2.

Then, the input value is shifted by 4 bits to the right and the AND operation is performed on the 4 least significant bits 0010 and the binary value 0101. Since the AND operation result is 0, 0 is added to the value of the output register.

Then, the current value of the output register is still 2.

The AND operation is then performed on the 4 least significant bits 0010 and the binary value 1010. Since the AND operation result is neither 1010 nor 0, 2 is added to the value of the output register.

Thus, the value of the output register becomes 4.

Next, the input value is further shifted by 4 bits to the right and the AND operation is sequentially performed on the least significant bits 0000 and the binary value 0101, and on the least significant bits 0000 and the binary value 1010. Since the AND operation results are both 0, 0 is added to the values of the output register twice. Subsequently, the input value is further shifted by 4 bits to the right and the AND operation is performed on the least significant bits 0000 in the same manner.

Since the AND operation results are both 0 as well, 0 is added to the values of the output register twice. Therefore, the final value of the output register becomes 4.

Since the value of the output register is neither smaller than 3 nor equal to 3, a binary value 0100 is stored as the input for the AND operation and the value of the output register is initialized to 0. Depending on the result of the AND operation performed on 0100 and 0101, 1 is added to the value of the output register, and depending on the result of the AND operation performed on 0100 and 1010, 0 is added to the value of the output register. The final value of the output register becomes 1, which is smaller than 3. Accordingly, 1 is outputted as the result value of the modulo 3 calculation.

While the invention has been shown and described with respect to the embodiments, it will be understood by those skilled in the art that various changes and modifications may be made without departing from the scope of the invention as defined in the following claims.

The invention claimed is:

1. A modulo N calculating method for an M1*M2-bit binary integer, wherein N, M1 and M2 are integers, the method comprising the steps of:
dividing, by a modulo N calculating apparatus, the M1*M2-bit binary integer into M1 bits and performing AND operation on each M1 bits and a specific binary integer; and
changing a value of an output register depending on the AND operation result and storing the value thereto,
wherein after the AND operation, a specific value depending on the AND operation result is added to the value of the output register by the steps of:
(a) performing the AND operation on the M1 least significant bits of the M1*M2-bit binary integer and a binary value 0101;
(b) adding one value of 0, 1 and 2 to the value of the output register depending on the AND operation result of the step (a);
(c) performing the AND operation on the M1 least significant bits of the M1*M2-bit binary integer and a binary value 1010;
(d) adding one value of 0, 2 and 4 to the value of the output register depending on the AND operation result of the step (c);

(e) shifting the M1*M2-bit binary integer by M1 bits to the right; and
(f) performing the steps (a) to (e) M2 times,
wherein a calculation result is applied to match speeds of turbo codec in a wireless communication system.

2. The method of claim 1, wherein when the M1 is 4 and the N is 3, the specific binary integer is binary value 0101.

3. The method of claim 1, wherein when the M1 is 4 and the N is 3, the specific binary integer is binary value 1010.

4. The method of claim 1, the specific value is added by the further steps of:
(g) after performing the step (f), determining whether the value of the output register is 3 or smaller; and
(h) performing the steps (a) to (d) repeatedly, until it is determined in the step (g) that the value of the output register is 3 or smaller.

5. A modulo N calculating apparatus comprising:
an input unit for receiving M1*M2-bit binary integer, wherein N, M1 and M2 are integers; and
an AND operation unit for performing AND operation on the M1*M2-bit binary integer and a specific binary integer,
wherein after the M1*M2-bit binary integer is divided into M1 bits, the AND operation unit performs AND operation on each M1 bits and the specific binary integer and one value of 0, 1 and 2 or one value of 0, 2 and 4 is added,
wherein a calculation result is applied to match speeds of turbo codec in a wireless communication system.

6. The apparatus of claim 5, wherein when the M1 is 4 and the N is 3, the specific binary integer is binary value 0101.

7. The apparatus of claim 5, wherein when the M1 is 4 and the N is 3, the specific binary integer is binary value 1010.

* * * * *